(12) United States Patent
Sprouse et al.

(10) Patent No.: US 7,007,486 B2
(45) Date of Patent: Mar. 7, 2006

(54) APPARATUS AND METHOD FOR SELECTING A FLOW MIXTURE

(75) Inventors: Kenneth M. Sprouse, Northridge, CA (US); Alan V. von Arx, Northridge, CA (US); David R. Matthews, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 10/397,412

(22) Filed: Mar. 26, 2003

(65) Prior Publication Data

US 2004/0187498 A1   Sep. 30, 2004

(51) Int. Cl.
F02C 7/22 (2006.01)
F02C 7/26 (2006.01)

(52) U.S. Cl. .................................. 60/776; 737/758

(58) Field of Classification Search .............. 60/776, 60/39.27, 737, 758, 760, 805, 723; 431/7, 431/170
See application file for complete search history.

(56) References Cited

U.S. PATENT DOCUMENTS

| | | | | |
|---|---|---|---|---|
| 2,655,787 A | * | 10/1953 | Brown ..................... | 60/39.23 |
| 2,930,192 A | * | 3/1960 | Johnson ..................... | 60/746 |
| 4,030,875 A | * | 6/1977 | Grondahl et al. ............. | 60/753 |
| 4,628,687 A | * | 12/1986 | Strom ..................... | 60/39.23 |
| 4,651,534 A | * | 3/1987 | Stroem ..................... | 60/732 |
| 4,731,989 A | * | 3/1988 | Furuya et al. ............... | 60/775 |
| 4,870,824 A | | 10/1989 | Young et al. | |
| 4,928,481 A | * | 5/1990 | Joshi et al. ................ | 60/737 |
| 5,054,280 A | * | 10/1991 | Ishibashi et al. ............ | 60/776 |
| 5,281,128 A | | 1/1994 | Dalla Betta et al. | |
| 5,309,637 A | | 5/1994 | Moriarty | |
| 5,319,923 A | * | 6/1994 | Leonard et al. ............. | 60/39.23 |
| 5,321,948 A | * | 6/1994 | Leonard ..................... | 60/737 |
| 5,450,725 A | * | 9/1995 | Takahara et al. ............. | 60/737 |
| 5,461,864 A | * | 10/1995 | Betta et al. ................ | 60/723 |
| 5,497,611 A | * | 3/1996 | Benz et al. ................. | 60/776 |
| 5,511,972 A | | 4/1996 | Dalla Betta et al. | |
| 5,512,250 A | | 4/1996 | Betta et al. | |
| 5,518,697 A | | 5/1996 | Dalla Betta et al. | |
| 5,575,153 A | * | 11/1996 | Ito et al. ................... | 60/737 |
| 5,675,971 A | | 10/1997 | Angel et al. | |
| 5,709,077 A | | 1/1998 | Beichel | |
| 5,715,673 A | | 2/1998 | Beichel | |
| 5,836,164 A | * | 11/1998 | Tsukahara et al. ........... | 60/733 |

(Continued)

OTHER PUBLICATIONS

Catalytica, How It Works, http://www.catalyticaenergy.com/xonon/how_it_works.html, printed Feb. 6, 2002.

(Continued)

Primary Examiner—William H. Rodriguez
(74) Attorney, Agent, or Firm—Harness Dickey & Pierce P.L.C.

(57) ABSTRACT

A counter-flow system for use in a turbine for selecting various mixtures of fluids for use with the system. The system may be used for a combustor for a gas powered turbine which employs a heat exchanger to combust a fuel without the emission of undesired chemical species. A gas powered turbine requires expanding gases to power the turbine blades. Fuel is combusted to produce the required gases. An oxidizer is introduced into the counter-flow system in a first direction before a first portion of fuel is introduced into the oxidizer. The fuel and oxidizer mixture is then flowed through a second pathway wherein the fuel and oxidizer mixture obtains a selected amount of thermal energy. Moreover, in a second pathway an equivalence ratio of the fuel and oxidizer mixture may be altered from the original fuel and oxidizer mixture.

15 Claims, 2 Drawing Sheets

U.S. PATENT DOCUMENTS

| | | | |
|---|---|---|---|
| 5,899,679 A | 5/1999 | Euzen et al. | |
| 5,956,937 A | 9/1999 | Beichel | |
| 5,970,702 A | 10/1999 | Beichel | |
| 6,170,264 B1 | 1/2001 | Viteri et al. | |
| 6,174,159 B1 | 1/2001 | Smith et al. | |
| 6,189,314 B1 * | 2/2001 | Yamamoto et al. | 60/776 |
| 6,192,688 B1 | 2/2001 | Beebe | |
| 6,209,325 B1 * | 4/2001 | Alkabie | 60/737 |
| 6,334,309 B1 | 1/2002 | Luciano et al. | |
| 6,358,040 B1 | 3/2002 | Pfefferle et al. | |
| 6,709,264 B1 * | 3/2004 | Hermann et al. | 431/170 |
| 2002/0139119 A1 | 10/2002 | Touchton et al. | |
| 2003/0192318 A1 * | 10/2003 | Sprouse et al. | 60/777 |
| 2003/0192319 A1 * | 10/2003 | Sprouse et al. | 60/777 |
| 2004/0000146 A1 * | 1/2004 | Inoue et al. | 60/776 |
| 2004/0003598 A1 * | 1/2004 | Farhangi | 60/777 |
| 2004/0048211 A1 * | 3/2004 | Martin et al. | 431/7 |

OTHER PUBLICATIONS

Catalytica, How It Works, http://www.catalyticaenergy.com/xonon/how_it_works1.html, printed Feb. 6, 2002.

* cited by examiner

APPARATUS AND METHOD FOR SELECTING A FLOW MIXTURE

FIELD OF THE INVENTION

The present invention relates generally to gas powered turbines for generating power, and more particularly to a low nitrous oxide emission combustion system for gas powered turbine systems.

BACKGROUND OF THE INVENTION

It is generally known in the art to power turbines with gases being expelled from combustion chambers. These gas powered turbines can produce power for many applications such as terrestrial power plants. In the gas powered turbine a fuel, such as a hydrocarbon (for example methane or kerosene) or hydrogen, is combusted in an oxygen rich environment. Generally, these combustion systems have high emissions of undesirable compounds such as nitrous oxide compounds (NOX) and carbon containing compounds. It is generally desirable to decrease these emissions as much as possible so that undesirable compounds do not enter the atmosphere. In particular, it has become desirable to reduce NOX emissions to a substantially low amount. Emissions of NOX are generally desired to be non-existent, and are accepted to be non-existent, if they are equal to or less than about one part per million volume of dry gas emissions.

In a combustion chamber fuel, such as methane, is combusted in atmospheric air where temperatures generally exceed about 1427° C. (about 2600° F.). When temperatures are above 1427° C., the nitrogen and oxygen compounds, both present in atmospheric air, undergo chemical reactions which produce nitrous oxide compounds. The energy provided by the high temperatures allows the breakdown of dinitrogen and dioxygen, especially in the presence of other materials such as metals, to produce NOX compounds such as $NO_2$ and NO.

It has been attempted to reduce NOX compounds by initially heating the air before it enters the combustion chambers to an auto-ignition temperature. If the air enters the combustion chamber at an auto-ignition temperature, then no flame is necessary to combust the fuel. Auto-ignition temperatures are usually lower than pilot flame temperatures or the temperatures inside recirculation flame holding zones. If no flame is required in the combustion chamber, the combustion chamber temperature is lower, at least locally, and decreases NOX emissions. One such method is to entrain the fuel in the air before it reaches the combustion chamber. This vitiated air, that is air which includes the fuel, is then ignited in a pre-burner to raise the temperature of the air before it reaches the main combustion chamber. This decreases NOX emissions substantially. Nevertheless, NOX emissions still exist due to the initial pre-burning. Therefore, it is desirable to decrease or eliminate this pre-burning, thereby substantially eliminating all NOX emissions.

Although the air is heated before entering the main combustion chamber, it may still be ignited in the combustion chamber to combust the remaining fuel. Therefore, an additional flame or arc is used to combust remaining fuel in the main combustion chamber. This reduces the temperature of the igniter, but still increases the temperature of the combustion chamber. In addition, no fuel is added to the air as it enters the combustion chamber. Rather all the fuel has already been entrained in the air before it enters the combustion chamber to be combusted. This greatly reduces control over where combustion occurs and the temperature in the combustion chamber.

SUMMARY OF THE INVENTION

The present invention is directed to a counter-flow system for selecting and altering an equivalence ratio within the system that may be used in a combustor and a combustion chamber for a gas powered turbine. The gas powered turbine requires expanding gases to power a turbine fan or blade. Fuel is generally combusted with an oxidizer to produce the required gases. Using the counter-flow system, a first portion of the fuel may be injected into a volume of the oxidizer after traveling through a first flow pathway to direct air in a first direction. In a mixing chamber, the first portion of fuel and volume of oxidizer are mixed before the resulting oxidizer and fuel mixture travel through a second flow pathway in a second direction. As the oxidizer and fuel mixture travel down the second flow pathway, it may be desired to change the oxidizer-to-fuel ratio to either thin or enrich the oxidizer-fuel mixture. This may be accomplished in various embodiments to have combustion occur at a selected point, to create a selected combustion temperature, or for various other reasons.

Further areas of applicability of the present invention will become apparent from the detailed description provided hereinafter. It should be understood that the detailed description while indicating various embodiments of the invention, is intended for purposes of illustration only and is not intended to limit the scope of the invention.

BRIEF DESCRIPTION OF THE DRAWINGS

The present invention will become more fully understood from the detailed description and the accompanying drawings, wherein.

DETAILED DESCRIPTION OF VARIOUS EMBODIMENTS

The following description of the various embodiments is merely exemplary in nature and is in no way intended to limit the invention, its application, or uses. Specifically, although the following combustor is described in conjunction with a terrestrial gas turbine, it may be used in other systems. Furthermore, the combustor, including the mixer and heat exchanger, may be used in systems other than turbine systems.

Figure 1:
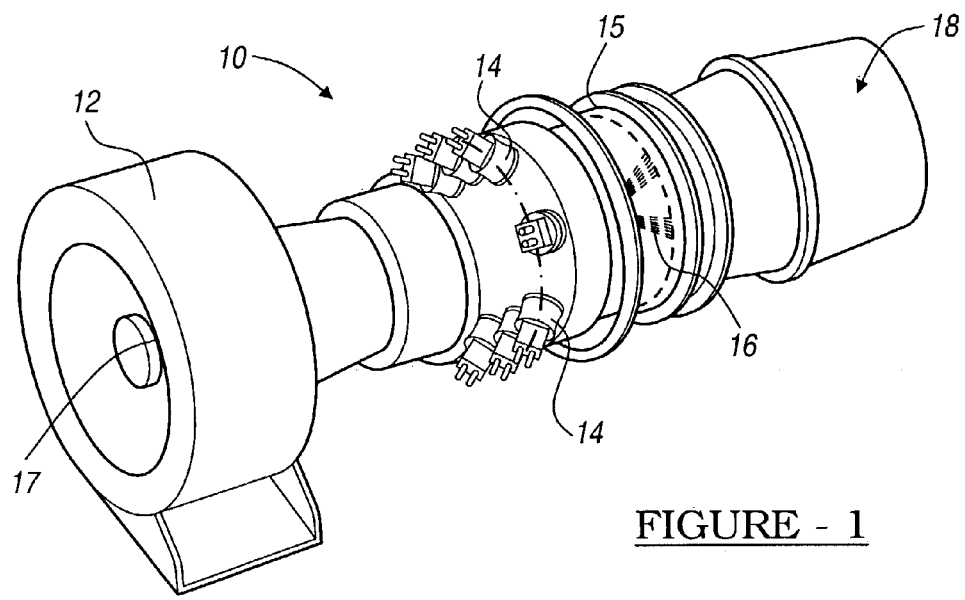
FIG. 1 is a perspective view of a gas powered turbine including a combustor in accordance with the present invention.

Referring to FIG. 1, a gas powered turbine in accordance with a preferred embodiment of the present invention is shown. The gas powered combustion turbine 10 may use several different gaseous fuels, such as hydrocarbons (including methane and propane) and hydrogen, that are combusted and that expand to move portions of the gas powered turbine 10 to produce power. An important component of the gas powered turbine 10 is a compressor 12 which forces atmospheric air into the gas powered turbine 10. It will be understood that the term "air", as used herein may refer to any appropriate oxidizer including pure oxygen, hydrogen peroxide, and other oxidizers. Also, the gas powered turbine 10 includes several combustion chambers 14 for combusting fuel. The combusted fuel is used to drive a turbine 15 including turbine blades forming one or more fans 16 which are axially displaced in the turbine 15. The actual number of fans employed depends upon the power the gas powered turbine 10 is to produce. Only a single turbine fan 16 is illustrated for clarity.

In general, the gas powered turbine 10 ingests atmospheric air and combusts a fuel, which powers the turbine fan 16. Essentially, air is pulled in and compressed with the compressor 12, which generally includes a plurality of concentric fan which grow progressively smaller along the axial length of the compressor 12. The fan in the compressor 12 are all powered by a single axle. The highly pressurized air then enters the combustion chambers 14 where fuel is added and combusted. Once the fuel is combusted, it expands out of the combustion chamber 14 and engages the turbine fan 16 which, due to aerodynamic and hydrodynamic forces, spins the turbine fan 16. The gases form an annulus that spin the turbine fan 16, which are affixed to a shaft (not shown). Generally, there are at least two turbine fan 16. One or more of the turbine fan 16 engage the same shaft that the compressor 12 engages.

The gas powered turbine 10 is self-powered since the spinning of the turbine fan 16 also powers the compressor 12 to compress air for introduction into the combustion chambers 14. Other turbine fan 16 are affixed to a second shaft 17 which extends from the gas powered turbine 10 to power an external device. After the gases have expanded through the turbine fan 16, they are expelled out through an exhaust port 18. It will be understood that gas powered turbines are used for many different applications such as engines for vehicles and aircraft or for power production in a terrestrially based gas powered turbine.

The gases which are exhausted from the gas powered turbine 10 include many different chemical compounds that are created during the combustion of the atmospheric air in the combustion chambers 14. If only pure oxygen and pure hydrocarbon fuel were combusted, absolutely completely and stoichiometrically, then the exhaust gases would include only carbon dioxide and water. Atmospheric air, however, is not 100% pure oxygen and includes many other compounds such as nitrogen and other trace compounds. Therefore, in the high energy environment of the combustion chambers 14, many different compounds may be produced. All of these compounds exit the exhaust port 18.

It is generally known in the art that an equivalence ratio is determined by dividing the actual ratio of fuel and air by a stoichiametric ratio of fuel-to-air (where there is not an excess of one starting material). It will be understood that although atmospheric air in a hydrocarbon fuel may be preferred for economic reason, other oxidizers and fuels may be provided. The air simply provides an oxidizer for the fuel.

It will be understood that the gas powered turbine 10 may include more than one combustion chamber 14. Any reference to only one combustion chamber 14, herein, is only for the purpose of discussion. The present invention may be used with any oxidizer or fuel which is used to power the gas powered turbine 10. Moreover, the combustor 14 may combine any appropriate fuel. Air is simply an exemplary oxidizer and hydrocarbons an exemplary fuel.

Figure 2:
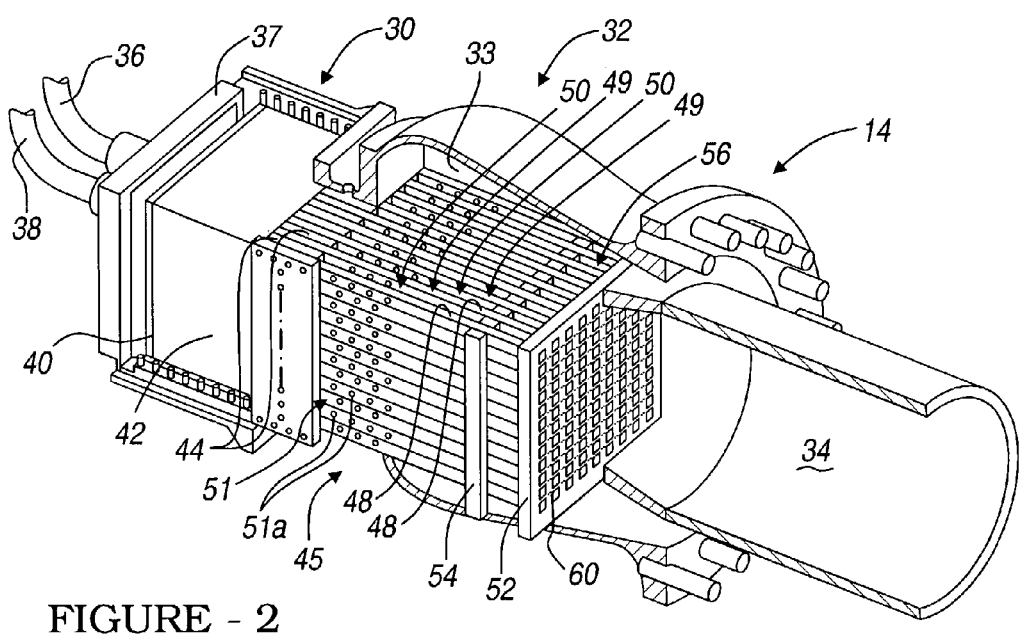
FIG. 2 is a partial cross-sectional perspective view of a single combustor.

With reference to FIG. 2, an exemplary combustion chamber 14 is illustrated. The combustion chamber may comprise any appropriate combustion chamber such as the one described in U.S. patent application Ser. No. 10/120,268 filed Apr. 10, 2002 entitled, "A Catalytic Combustor For Substantially Eliminating Nitrous Oxide Emissions," assigned to The Boeing Company, and incorporated herein by reference. The combustion chamber 14 includes a premix section or area 30, a heat exchange or pre-heat section 32 generally enclosed in a heat exchange chamber 33, and a main combustion section 34. A first or premix fuel line 36 provides fuel to the premix area 30 through a fuel manifold 37 while a second or main fuel line 38 provides fuel to the main combustion section 34 through a main injector 52. Positioned in the premix area 30 is a premix injector 40 which injects fuel from the first fuel line 36 into a premix chamber or premixer 42. Air from the compressor 12 enters the premix area 30 through a plurality of cooling tubes 44 of a heat exchanger or pre-heater 45 (detailed in FIG. 3). The premix chamber 42 encompasses a volume between the premix injector 40 and the exit of the cooling tubes 44.

With further reference to FIG. 2, a plurality of heat exchange tubes 48 extend into the heat exchange area 32. The heat exchange tubes 48 are spaced laterally apart. The heat exchange tubes 48, are positioned vertically adjacent one another. This configuration creates a plurality of laterally spaced apart columns 49 formed by the heat exchange tubes 48. Each heat exchange tube 48, and the column 49 as a whole, defines a pathway for heated air to travel through. The columns 49 define a plurality of channels 50 between adjacent columns 49. It will be understood this is simply exemplary and the tubes may be spaced in any configuration to form the various pathways. Extending inwardly from the walls of the heat exchange chamber 33 may be directing fins (not particularly shown). The directing fins direct the flow of air to the top and the bottom of the heat exchange chamber 33 so that air is directed to flow vertically through the channels 50 defined by the heat exchange tubes 48.

Near the ends of the heat exchange tubes 48, where the heat exchange tubes 48 meet the main combustion section 34, is a main injector 52. The second fuel line 38 provides fuel to the main injector 52 so that fuel may be injected at the end of each heat exchange tube 48. Spaced away from the main injector 52, towards the premix area 30, is an intra-propellant plate 54. The intra-propellant plate 54 separates the air that is traveling through the channels 50 and the fuel that is being fed to the fuel manifold region between the main injector face 52 and intra-propellant plate 54. It will be understood, that the intra-propellant plate 54 is effectively a solid plate, though not literally so in this embodiment. The presence of the heat exchange tubes 48 dictate that the intra-propellant plate 54 be segmented wherein one portion of the intrapropellant plate 54 is placed in each channel 50 between two columns 49.

Air which exits out the heat exchange tubes 48 is entrained with fuel injected from an injector port 60 in the main injector 52 and this fuel then combusts in the main combustion section 34. The main combustion section 34 directs the expanding gases of the combusted fuel to engage the turbine fan 16 so that the expanded gases may power the turbine fan 16.

Formed in an exposed side of the heat exchange tube 48 is a second oxidizer inlet 51. The second oxidizer inlet 51 may be formed in any manner, but is illustrated to include a plurality of dilution holes or bores 51a. The dilution bores 51a are positioned on the heat exchange tubes 48 between the cooling tubes 44 and the intrapropellant plate 54. The dilution bores 51a are exposed to the channels 50 formed between the columns 49 of the heat exchange tubes 48. This allows the oxidizer to enter the heat exchange tubes 48 without first being mixed with fuel in the pre-mix chamber 42. As described further herein, this allows the fuel and oxidizer mixture flowing through the heat exchange tubes 48 into the combustion area 34 to be thinned.

Figure 3:
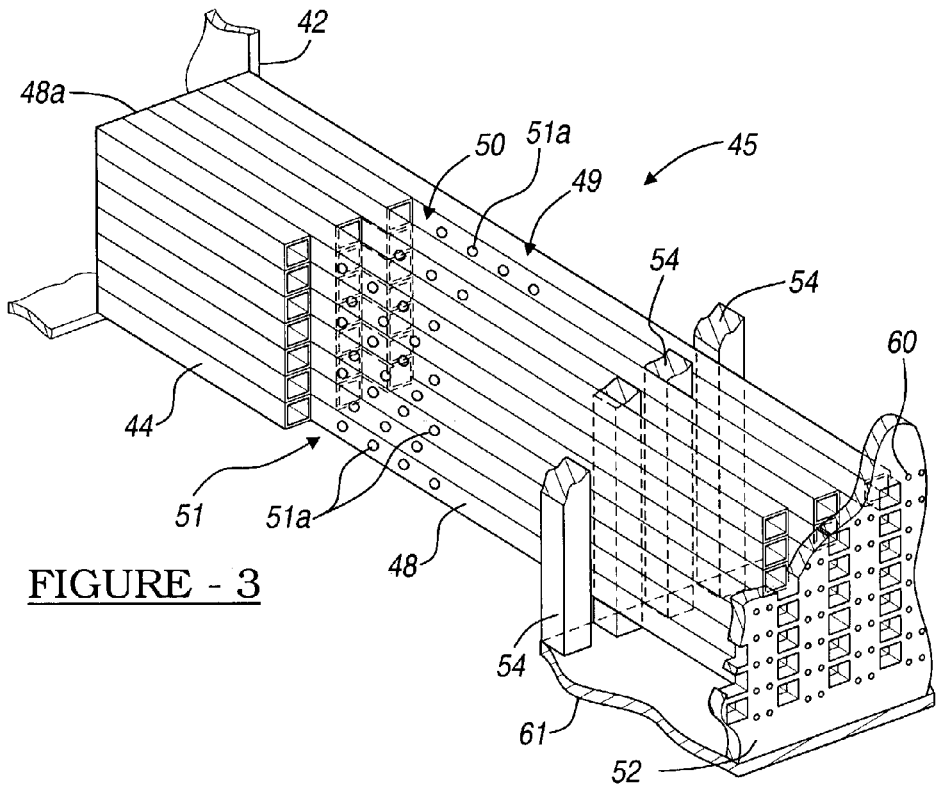
FIG. 3 is a detailed, partial cross-sectional, perspective view of a portion of the combustor.

Turning reference to FIG. 3, a detailed portion of the heat exchanger 45 is illustrated. Although, in one embodiment, the heat exchanger 45 includes a large plurality of tubes, as generally shown in FIG. 2, only a few of the heat exchange tubes 48 and cooling tubes 44 are illustrated here for convenience. The heat exchanger 45 is similar to that described in U.S. Pat. No. 5,309,637 entitled "Method of Manufacturing A Micro-Passage Plate Fin Heat Exchanger", incorporated herein by reference. The heat exchanger 45 includes a plurality of cooling tubes 44 disposed parallel to and closely adjacent the heat exchange tubes 48. Each of the cooling tubes 44 and the heat exchange tubes 48 have a generally rectangular cross section and can be made of any generally good thermally conductive material. Preferably, the heat exchange tubes 48 and the cooling tubes 44 are formed of stainless steel. It will be appreciated that while the cooling tubes 44 and the heat exchange tubes 48 are shown as being substantially square, the cross-sectional shape of the components could comprise a variety of shapes other than squares. It is believed, however, that the generally square shape will provide the best thermal transfer between the tubes 44 and 48.

Both the cooling tubes 44 and the heat exchange tubes 48 may be of any appropriate size, but preferably each are generally square having a width and height of between about 0.04 inches and about 1.0 inches (between about 0.1 centimeters and about 2.5 centimeters). The thickness of the walls of the cooling tubes 44 and the heat exchange tubes 48 may be any appropriate thickness. The walls need to be of a thickness that allows for an efficient transfer of heat between the inside of the heat exchange tubes 48 and the air in the channels 50 and cooling tubes 44 but is still sufficiently strong to resist cracking. The wall thickness may also vary by size and material choice. A typical wall thickness is between about 0.100 mm and about 1.00 mm (about 0.004 in and about 0.04 in).

The cooling tubes 44 extend parallel to the heat exchange tubes 48 for a portion of the length of the heat exchange tubes 48. Generally, one of the cooling tubes 44 is brazed to one of the heat exchange tubes 48 for the distance that they are placed adjacent one another. The cooling tubes 44 extend between the columns 49 of the heat exchanger tubes 48. The cooling tubes 44 and the heat exchange tubes 48, when brazed together, form the heat exchanger 45 which can provide a surface-to-surface exchange of heat. It will be understood, however, that air traveling in the channels 50 between the heat exchange tubes 48 also may become heated due to the heat transferred from the heat exchange tubes 48 to the air in the channels 50.

Referring further to FIG. 3, fuel injection ports 60 are formed in the main injector 52. The injector ports 60 may be provided in any appropriate number. According to various embodiments, there is a ratio of heat exchange tubes 48 to injectors 60 of at least one-to-one. It will be understood, however, that any appropriate ratio of the injectors 60 to the heat exchange tubes 48 may be provided. The fuel is provided to the manifold region 56 which is bound by the intra-propellant plate 54, the main injector plate 52, and a manifold plate 61. The manifold plate 61 may underlay, overlay, or surround the manifold region 56. This provides fuel to each of the injector ports 60 without requiring an individual fuel line to each injector port 60. Therefore, as air exits each heat exchange tube 48, fuel is injected from the injector port 60 to the stream of air emitted from each heat exchange tube 48. In this way, the fuel can be very efficiently and quickly distributed throughout the air flowing from the heat exchanger 45.

Referring further to FIG. 3, the dilution bores 51a are defined by an exterior wall of the heat exchange tubes 48. However, only the side or lateral walls of the heat exchange tubes 48 are exposed because they are brazed to one another top and bottom to form the heat exchange columns 49. Nevertheless, the dilution bores 51a provide an entrance to the heat exchange tubes 48 separate from the entrance bore 48a defined by the heat exchange tube 48. The size and shape of the dilution bores 51a may be chosen depending upon the selected amount of dilution or rate of dilution desired. Moreover, a plurality of the dilution bores 51a may be formed on each of the heat exchange tubes 48. Each of the plurality of the dilution bores 51a may differ to vary the amount and location of air allowed to enter the heat exchange tubes 48. Each of the heat exchange tubes 48 is not required to define an identical number of the dilution bores 51a. Rather, each heat exchange tube 48 may be provided with a unique number of the dilution bores 51a to provide the selected amount of dilution in a selected region of the heat exchanger 45.

Figure 4:
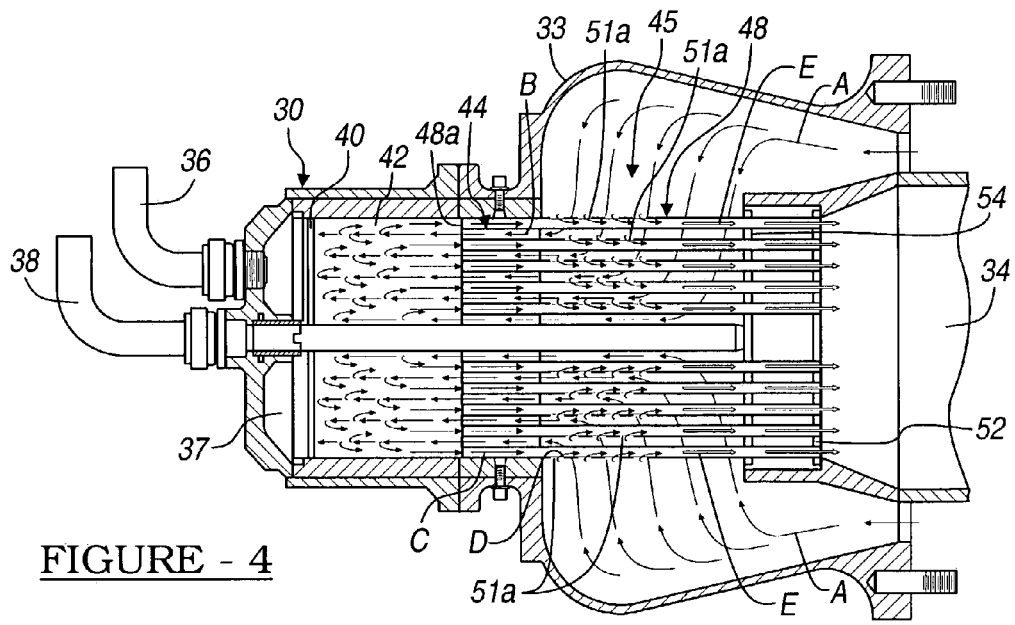
FIG. 4 is a simplified diagrammatic view of the flow of oxidizer through the combustor including a diluting flow of oxidizer.

With continuing reference to FIGS. 1–3 and further reference to FIG. 4, a method of using the combustion chamber 14 according to the various preferred embodiments will be described. The combustor 14 includes a pre-mixer 42 that may include an open region, as illustrated in FIG. 4, but may also include any appropriate design to mix fuel with the incoming air. When an open region is used as the pre-mixer 42, the flow generally follows the path indicated by the arrows in FIG. 4. It will also be understood that a greater plurality of tubes will typically be employed than the number shown in FIG. 3, as described above, are present in the heat exchanger 45, that a lesser plurality has been illustrated merely to avoid cluttering the Figure.

Atmospheric air is compressed in the compressor 12 and then introduced into the heat exchange chamber 33 at a high pressure and flows along a first oxidizer flow path represented by arrows A. The first oxidizer flow path A generally includes the air that enters the heat exchange chamber 33. This air is directed by the directing fins (not shown) to the top and bottom of the heat exchange chamber 33 so that the air may flow through the channels 50 along arrows B, which also forms a portion of the first oxidizer pathway. The air that enters the heat exchange chamber 33 may be at a temperature between about 37° C. and about 427° C. (about 100° F. and about 800° F.). Generally, however, the air enters the heat exchanger 45 at a temperature of about 204° C. to about 400° C. (about 400° F. to about 750° F.).

As the air travels in the channels 50, the air increases in temperature to become "hot" air. The hot air continues to flow through the first oxidizer pathway formed in part by the cooling tubes 44 and into the premix area 30. The hot air also receives thermal energy while flowing through the cooling tubes 44. It will be understood that the cooling tubes 44 are adjacent a portion of the heat exchange tubes 48. The temperature of the hot air, as it enters the premix area 30, is between about 427° C. and about 538° C. (about 800° F. and about 1000° F.). The air in the premix area 30 makes a turn within the premix chamber 42. As the air turns inside the premix chamber 42, the premix injector 40 injects fuel into the air, entraining the fuel in the air to form a first oxidizer-fuel mixture. About 30% to about 60% of all the fuel used to power the gas powered turbine 10 is entrained in this manner in the premix chamber 42.

After the air enters the premix chamber 42 it then flows out through the pathway formed by a first portion of the heat exchange tubes 48 along the first oxidizer-fuel mixture pathway or conduit arrow C. It will be understood, as illustrated, that the first oxidizer-fuel mixture pathway C is substantially parallel to the first oxidizer pathway B. Therefore, the flow of the first oxidizer-fuel mixture C is substantially about 180° relative to the first oxidizer pathway B. Nevertheless, it will be understood that the pathways need not be substantially parallel but may be formed in a generally appropriate orientation, such as perpendicular.

Due to friction and other sources of heat energy, a portion of the fuel entrained in the mixture may combust while flowing through the heat exchange tubes 48. This increases the temperature of the first oxidizer-fuel mixture as it flows through the heat exchange tubes before it exits into the combustion chamber 34. Nevertheless, the air and fuel mixture flow through the heat exchange tubes from the pre-mix area 42 to the combustion area 34.

Alternatively, a catalyst may be placed within the heat exchange tubes 48 to cause the fuel in the air to combust as it engages the catalyst which is disposed on the inside walls of the heat exchange tubes 48. As the fuel combusts, the temperature of the air rises to between about 768° C. and 930° C. (between about 1400° F. and about 1700° F.). As the temperature of the air rises, it becomes highly energetic to form high energy air, then the high energy air exits the heat exchange tubes 48 into the combustion area 34. The temperature the high energy air reaches in the heat exchange tubes 48 is at least the hypergolic or auto-ignition temperature of the fuel being used in the gas powered turbine 10. Therefore, the high energy air that exits the heat exchange tubes 48 is, and may also be referred to as, hypergolic or auto ignition air. The auto-ignition temperature of the air is the temperature that the air may be at or above so that when more fuel is injected into the hypergolic air the fuel ignites automatically without any other catalyst or ignition source.

With continuing reference to FIG. 4, the second oxidation inlet 51 forms a second oxidizer flow path or conduit. The inlet 52 allows a second portion of the compressed air flowing along arrows A to enter the heat exchange tubes 48 without first being mixed with a portion of the fuel in the pre-mix area 42. The second oxidizer flow path includes the air that enters the chamber 33 along arrows A which then enters the heat exchange tubes 48 through the second oxidizer inlet 51 along path arrow D. Specifically, air coming in from the compressor enters the dilution bores 51a before traveling to the pre-mix chamber 42 in the direction of arrows B. That is, the air flows through the air dilution bores 51a along arrow D and flows from the air dilution bore 51a to the combustion area 34 without first entering the pre-mix area 42. This forms a second oxidizer-fuel mixture pathway or conduit, along arrow E, and allows the air/fuel mixture in the heat exchange tubes 48 to be thinned or diluted in a controlled manner. Therefore, a sufficient amount of fuel can be added to the air flow in the pre-mix chamber 42, thereby allowing the air to reach a desired temperature, while ensuring an efficient combustion of the fuel in the heat exchange tubes 48 due to the presence of the additional air.

The use of the second oxidizer inlet 51 allows the equivalence ratio of the first oxidizer-fuel mixture entering the heat exchange tubes 48 at the entrance 48a to be between about 0.3 and 0.6. This allows for a greater production of energy per unit of air than if the equivalence ratio was lower. This allows the air in the heat exchanger to rapidly increase to the desired temperature. Moreover, it will allow the use of less active catalysts which may be disposed within the heat exchange tubes 48. Nevertheless, the presence of the second oxidizer inlet 51 allows the equivalence ratio of the fuel oxidizer mixture to be reduced as it travels along the length of the heat exchange tubes 48. Simply, the air dilution bores 51a allow air to enter the heat exchange tubes 48 which has not been entrained with any fuel. Therefore, the air that enters the air dilution bores 51a reduces the equivalence ratio of the first oxidizer-fuel mixture flowing through the heat exchange tubes 48 to a more desired ratio, in forming the second oxidizer-fuel mixture. Generally, the diluted ratio is preferably between about 0.1 and 0.3. This allows the air, as it travels through the heat exchange tubes 48, to be maintained at a selected temperature. A reduced equivalence ratio allows for a reduced or lower temperature than if a higher equivalence ratio were maintained. This allows the heat exchange tubes 48 to be maintained at a lower temperature to decrease wear on the system, thereby increasing longevity and workability of the combustor 14.

Additional fuel is injected through the main injector 52 as the air exits the heat exchange tubes 48 and enters the main combustion section 34. The fuel injected from the main injector 52 is injected through the individual injector ports 60. Any suitable ratio of injector ports 60 to heat exchange tubes 48 may be used as long as all of the air exiting the heat exchanger 45 is thoroughly mixed with fuel. Any additional fuel to power the gas powered turbine 10 is injected at this point, such that fuel is added to the air at the premix chamber 42 and from the injector ports 60.

As the air travels through the heat exchange tubes 48, the fuel that was entrained in the air in the premix chamber 42 is combusted. This raises the temperature of the air from the temperature that it enters the heat exchange chamber 33. In particular, the temperature of the air is raised to generally between about 700° C. and 880° C. (between about 1300° F. and about 1600° F.). Moreover, the presence of the air dilution bores 51a maintains the desired equivalence ratio thus allowing the maintenance of the selected temperature. This temperature is generally the hypergolic temperature so that the fuel combusts spontaneously when added through the injector port 60. It will be understood that different fuels have different hypergolic temperatures. Therefore, the amount of fuel added in the premix section 42 may be altered to determine the temperature of the air exiting the heat exchange tubes 48.

The temperature of the air, after the additional fuel has been combusted from the main injector 52, is between about 1315° C. and 1595° C. (about 2400° F. and about 2800° F.). Preferably, the temperature, however, is not more than about 1426° C. (about 2600° F.). Different fuel-to-air ratios may be used to control the temperature in the main combustion section 34. The main combustion section 34 directs the expanding gases into a transition tube (not shown) so that it engages the turbine fan 16 in the turbine area 15 at an appropriate cross sectional flow shape.

The use of the heat exchanger 45 raises the temperature of the air to create hot or heated air. When a catalyst is used, the hot air allows the catalyst to combust the fuel that has been entrained in the air in the premix chamber 42 without the need for any other ignition sources. The catalyst only interacts with the hydrocarbon fuel and the oxygen in the air to combust the fuel without reacting or creating other chemical species. Therefore, the products of the combustion in the heat exchange tubes 48 are substantially only carbon dioxide and water due to the catalyst placed therein. No significant amounts of other chemical species are produced because of the use of the catalyst. Also, the use of the heat exchange tubes 48, with a catalyst disposed therein, allows the temperature of the air to reach the auto-ignition temperature of the fuel so that no additional ignition sources are necessary in the main combustion section 34. Therefore, the temperature of the air does not reach a temperature where extraneous species may be easily produced, such as NOX chemicals. Due to this, the emissions of the gas powered turbine 10 of the present invention have virtually no NOX emissions. That is, that the NOX emissions of the gas powered turbine 10 according to the present invention are generally below about 1 part per million volume dry weight.

Additionally, the equivalence ratio in the premix area 42 is generally between about 0.20 and 0.30, while the equivalence ratio at the main injector 52 is between about 0.50 and about 0.60. This means that the fuel combustion occurs as a lean mixture in both areas. Therefore, there is never an excessive amount of fuel that is not combusted. Also, the lean mixture helps to lower temperatures of the air to more easily control side reactions. It will be understood that different fuel ratios may be used to produce different temperatures. This may be necessary for different fuels.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A counter-flow combustor apparatus for use in a turbine for combusting a fuel in the presence of an oxidizer, the apparatus comprising:
   an oxidizer flow pathway defined by a first plurality of paths to direct a flow of a first portion of an oxidizer in a first direction along a first axis;
   a first fuel inlet to provide a first portion of fuel to said first portion of said oxidizer;
   a first mixing section to allow said oxidizer and said first portion of said fuel to mix, thereby forming a first oxidizer-fuel mixture;
   a first oxidizer-fuel pathway defined by a second plurality of paths to direct a flow of said first oxidizer-fuel mixture in a second direction along said first axis; and
   a second oxidizer inlet to form a second oxidizer-fuel mixture by allowing a second portion of said oxidizer to mix with the first oxidizer-fuel mixture.

2. The counter-flow combustor apparatus of claim 1, further comprising:
   a combustion chamber into which said second oxidizer-fuel mixture flows.

3. A counter-flow combustor apparatus for use in a turbine for combusting a fuel in the presence of an oxidizer, the apparatus comprising:
   an oxidizer flow pathway to direct a flow of a first portion of an oxidizer in a first direction along a first axis;
   a first fuel inlet to provide a first portion of fuel to said first portion of said oxidizer;
   a first mixing section to allow said oxidizer and said first portion of said fuel to mix, thereby forming a first oxidizer-fuel mixture;
   a first oxidizer-fuel pathway to direct a flow of said first oxidizer-fuel mixture in a second direction along said first axis;
   a second oxidizer inlet to form a second oxidizer-fuel mixture by allowing a second portion of said oxidizer to mix with the first oxidizer-fuel mixture;
   a second oxidizer-fuel pathway to direct a flow in said second direction;
   a second fuel inlet substantially near an outlet of said second oxidizer-fuel pathway; and
   wherein a second portion of fuel is injected into said second oxidizer-fuel mixture to be combusted in a combustion chamber.

4. The counter-flow combustor apparatus of claim 3, wherein said second oxidizer-fuel pathway defines said second oxidizer inlet; and
   wherein said first oxidizer-fuel mixture flows through said second oxidizer-fuel pathway to be mixed with said second portion of the oxidizer.

5. The counter-flow of combustor apparatus of claim 3, wherein said second oxidizer-fuel pathway is substantially parallel with said first axis.

6. The counter-flow combustor apparatus of claim 3, wherein said first oxidizer-fuel mixture flows through said second oxidizer-fuel pathway in said second direction;
   wherein said second direction is generally about 180° relative to said first direction.

7. The counter-flow apparatus of claim 3, wherein said first oxidizer-fuel pathway and said second oxidizer-fuel pathway are selected from a group comprising at least one of a tube, a fin, a column, and combinations thereof.

8. The counter-flow combustor apparatus of claim 3, wherein:
   said second oxidizer inlet includes a port defined by said second oxidizer-fuel pathway;
   said second oxidizer-fuel pathway is a tube.

9. A combustor for use in a gas powered turbine, the combustor comprising:
   a first oxidizer inlet for receiving a first volume of an oxidizer;
   a first flow conduit for directing the first volume oxidizer to a first injection area, wherein a first portion of fuel is injected into the oxidizer to form a first oxidizer-fuel mixture;
   a second flow conduit for directing the first oxidizer-fuel mixture; and
   a second oxidizer inlet associated with said second flow conduit to receive a second volume of the oxidizer into the first oxidizer-fuel mixture to form a second oxidizer-fuel mixture;
   an oxidizer pathway to direct the oxidizer;
   a first fuel inlet associated with said oxidizer pathway; and
   wherein a volume of fuel is injected into said oxidizer pathway as the first volume of the oxidizer moves through said oxidizer pathway.

10. The combustor of claim 9, wherein said oxidizer pathway operatively interconnects said first oxidizer inlet and said first flow conduit such that the oxidizer entering said first oxidizer inlet is directed towards and through said first flow conduit.

11. The combustor of claim 9, wherein:
    said second flow conduit includes a tube for directing the flow of the first oxidizer-fuel mixture; and
    said tube includes a wall substantially enclosing a flow pathway for flowing the first oxidizer-fuel mixture.

12. The combustor of claim 11, wherein:
    said second oxidizer inlet includes a bore defined by said tube of said second flow conduit; and
    the second volume of the oxidizer moves into said second flow conduit through said bores.

13. The combustor of claim 9, wherein:
    said second flow conduit includes a wall; and said second oxidizer inlet includes a bore of a selected size such that the second volume of the oxidizer is substantially controlled.

14. The combustor of claim 13, wherein:

said bore includes a plurality of bore pathways, such that a selected plurality and a selected size for each of said selected plurality of said bore pathways substantially controls the second volume of the oxidizer.

15. The combustor of claim 9, wherein:

said first oxidizer-fuel mixture includes a first equivalent ratio;

said second oxidizer-fuel mixture includes a second equivalence ratio;

wherein said first equivalence ratio and said second equivalence ratio are selected to be at least one of the group comprising:

the first equivalence ratio equal to the second equivalence ratio; and the first equivalence ratio greater than the second equivalence ratio.

* * * * *